Patented Sept. 13, 1938

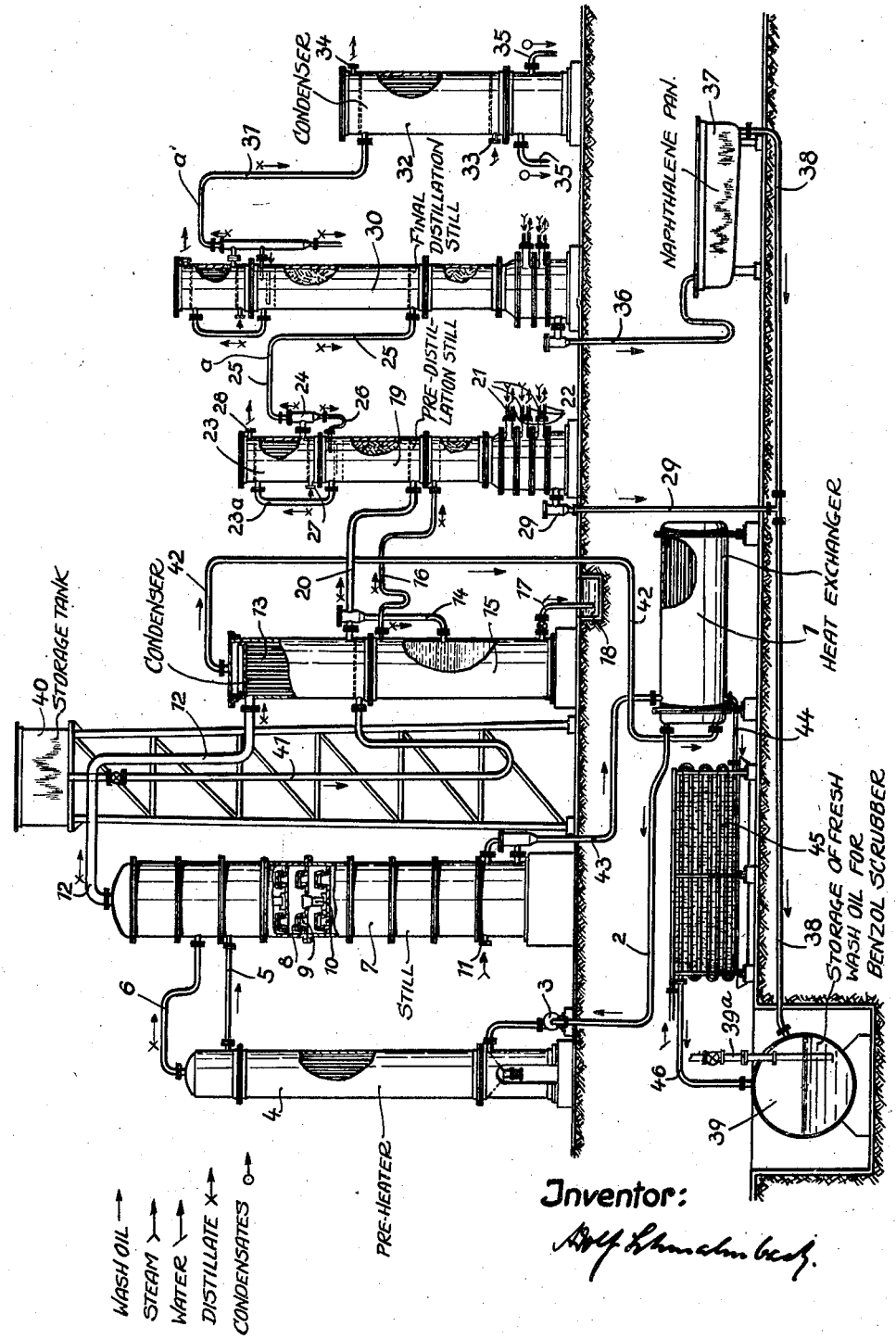

2,129,787

UNITED STATES PATENT OFFICE 2,129,787

REMOVAL AND RECOVERY OF BENZOL AND NAPHTHALENE FROM GASES

Adolf Schmalenbach, Essen, Germany, assignor, by mesne assignments, to Koppers Company, a corporation of Delaware Application January 25, 1934, Serial No. 708,181
In Germany January 25, 1933

1 Claim. (Cl. 202—39)

The invention relates to the removal and recovery of benzol, its homologues and naphthalene from gases, particularly coal distillation gases.

The object of the present invention is to provide such improvements in the removal and recovery of benzol, its homologues and naphthalene from gases, particularly coal distillation gases, that the removal of the said substances from the gas can be effected in a single operation and benzol and homologues and naphthalene on the other hand can be recovered separately in practically pure condition.

Normal coal distillation gas contains, after the usual so-called final cooling and before the scrubbers serving to remove benzol, about 25 grammes benzol and homologues per cubic meter and about 0.4 to 0.6 gramme naphthalene. For the removal of benzol and homologues the gas is washed with a usual washing oil. The used washing oil is subjected to steam distillation. The vapors of distillation thus produced contain about equal quantities by weight of washing oil and benzol, i. e. about 50% benzol and homologues and about 2% naphthalene. From the condensate of the steam distillation benzol and homologues are removed by rectification, whilst the naphthalene-containing oil remains behind.

As the quantity of the naphthalene in the residual oil, as stated, only amounts to about 2%, it is not possible to separate the naphthalene from the oil by crystallization whilst cooling to temperatures still obtainable, having due regard to favorable economy, without artificial cooling. Consequently the washing oil becomes enriched with naphthalene, which in the usual manner is used in circulation for renewed washing of benzol from the gas, gradually to such a quantity that the vapor pressure of the washing oil in connection with naphthalene is in equilibrium with the vapor pressure of the gas as regards naphthalene. In the case of normal washing oil this point lies at about 12% naphthalene. Beyond this point an enriching of the washing oil with naphthalene is not possible in the method of operation hitherto usual. But even with a content of naphthalene of 12% the naphthalene cannot be recovered from the washing oil without artificial cooling.

According to the present invention the separation both of benzol and of naphthalene from the washing oil, which served for both the removal of benzol and homologues and also naphthalene from the gases, is rendered fundamentally possible in that the condensates derived from distilling the washing oil, coming from the scrubber, in the steam distillation step is subjected before the rectification to a pre-distillation for the recovery of benzol and homologues, which is carried out at such a temperature that the heavier constituents of the washing oil remain behind, whilst the lighter constituents of the washing oil together with benzol, its homologues and naphthalene are evaporated. The vapors produced by this pre-distillation are then conducted into the rectification apparatus including a still for distillation of benzol and homologues, from which there is withdrawn, after driving off benzol and homologues, an oil with a content of about 30% naphthalene. From this part of the distillation step oil highly enriched with naphthalene is produced and there can be separated a very pure naphthalene by crystallization with cooling to room temperatures above 10° C. which can be obtained directly without artificial cooling.

The quantity of heavy constituents of washing oil which occurs in the pre-distillation step according to the invention varies. In general it amounts to about 80 to 90% of the condensed oil containing benzol and naphthalene introduced into the pre-distillation apparatus in the case when the main quantity of naphthalene is to be separated from the heavier constituents of the washing oil in the pre-distillation stage.

The heavier constituents of the washing oil remaining in the pre-distillation stage, are mixed with the lighter constituents, which remain in the main distillation stage, after the naphthalene has been separated from the lighter constituents by cooling, and then are again used together for washing benzol and naphthalene from the gas.

The invention will now be described with reference to the accompanying drawing showing, partly in elevation and partly in cross section, apparatus for practicing the invention.

In the arrangement shown in the drawing used washing oil, containing benzol and naphthalene, from the container 1, of which the function is described hereinafter, is supplied through a pipe line 2 by means of a pump 3 to a heating device 4. The hot washing oil and the vapors produced during the heating pass from the device 4 through the pipe lines 5 and 6 into a known primary distilling column apparatus 7. This column apparatus 7 has a series of bottoms or trays which are provided with vapor openings 9 covered by bells 8, and at the middle each has a liquid overflow 10. Steam is introduced into the bottom of the column apparatus through the pipe line 11. The steam rises through the openings 9 in the bottoms of the column apparatus, whilst the washing oil flows downwardly in the apparatus 7 from top to bottom through the openings 10. Steam and washing oil in this manner come into intimate contact with one another, whereby the washing oil is heated. The vapors produced in the column apparatus 7 such as steam, benzol, its homologues, naphthalene and some of the wash oil, escape through the pipe line 12 and pass into a condensing device 13 where they are cooled. The liquid condensates thus formed flow through the pipe line 14 into a separating tank 15. In the separating tank 15 the water escaping from the apparatus 7 separates from the oily substances. The latter are withdrawn at the upper end of the separating tank 15 through the pipe line 16, whilst the water passes through the pipe line 17 into the tank 18.

The oily constituents are now conducted through the pipe line 16 into the still 19. To the still 19 there are also supplied through the pipe line 20 those gaseous constituents which were not condensed in the condensing device 13.

Into the lower part of the still 19 there is supplied through the pipe lines 21 steam which in the interior of the apparatus flows through pipe coils or the like not shown in the drawing. The condensed water is withdrawn from these heating pipe coils through the pipe lines 22. The liquid in the still 19 is thus heated indirectly. The vapors thus formed, benzol, its homologues, naphthalene, and a small part of the wash oil vapor condensed from the still 19, rise and pass through the pipe line 23a into the dephlegmator part 23 of the apparatus 19, maintained at a predetermined temperature, from which they escape through the pipe line 25 after passing a separating bottle 24 for separating the constituents condensed in the dephlegmator. The condensate from the separating bottle 24 flows through the pipe line 26 back into the still 19. For cooling the dephlegmator there is preferably used cold water which flows to a cooling pipe system, located in the interior of the dephlegmator 23, through a pipe line 27 and flows out through a pipe line 28.

The oil which is not evaporated in the still 19 and which mainly consists of the heavier constituents of the washing oil and is practically free from naphthalene, is withdrawn through the pipe line 29.

The vapors produced in the still 19 pass through the pipe line 25 into the main distillation still 30 which is arranged substantially in the same manner as the still 19.

The vapors produced in the main distillation still, which practically consists only of benzol and its homologues, pass through the pipe line 31 into a cooling apparatus 32 in which they are deposited. Cold water is supplied to the cooling apparatus 32 through the pipe line 33, passes through a cooling pipe system located in the interior of the apparatus 32 and flows out through the pipe line 34. The condensates formed in the apparatus 32 are withdrawn from the lower part of the apparatus through the pipe lines 35.

The liquid constituents which are not evaporated in the main distillation still 30 flow through the pipe line 36 to a naphthalene crystallizing pan 37 in which they are cooled to about room temperature but above 10° C. As a result solid crystalline naphthalene separates from the liquid which contains about 30% naphthalene. The residual liquid passes from the device 37 through the pipe line 38 into the storage tank 39 for the washing oil to be re-used for washing out benzol and naphthalene. To the pipe line 38 is also connected the pipe line 29 so that thus the whole of the washing oil freed from benzol, its homologues and naphthalene, which was driven off in the column apparatus 7, is again continued.

There will now be described the path followed by the used washing oil which is treated in the apparatus shown in the drawing. The used washing oil withdrawn from the scrubbers, not shown in the drawing, which serve for washing benzol, its homologues and naphthalene from the gas, is conducted to a storage tank 40. From this it flows through the pipe line 41 into the cooling pipe system of the condensing device 13 in which it is used for cooling the vapors escaping from the column apparatus 7. In this manner there is obtained simultaneously an advantageous preheating of the cold used washing oil. The washing oil thus preheated then passes through the pipe 42 into the tank 1, which simultaneously serves as storage tank and as heat exchanging apparatus. The used crude washing oil is here further preheated, the hot unvaporized washing oil from the column still 7 here serving for the preheating. For this purpose there is connected to the bottom of the column apparatus 7 the pipe line 43 through which the hot washing oil flows from 7 into a pipe system located in the interior of the tank 1. In the tank 1 the hot residual oil of the column apparatus 7 imparts a portion of its heat to the colder untreated washing oil. The residual oil pre-cooled in this manner then flows through the pipe line 44 into a pipe cooling apparatus 45, sprayed with water from which it passes through the pipe line 46 into the storage tank 39 for fresh washing oil. The regenerated wash oil is pumped continuously in cycle back to the gas-washing benzol-scrubber (not shown) through a pipe line 39a. At certain intervals part of the wash oil, circulating from the benzol scrubber to the distillation plant and thence to the tank 39 for return back to the benzol scrubber, must be replaced by new or fresher wash oil to replace deterioration. The added oil may be introduced into tank 39, or at any other point in the cycle of flow of the benzol-absorbent wash oil.

The process according to the invention is carried into effect somewhat in the following manner:

It is assumed that the gas of a coal distillation plant is to be treated which has an average of 1000 metric tons of dry coal per day. The coking of this coal produces about 300 cubic meters of gas per ton of coal, that is daily 300,000 cubic meters of gas. After the usual final cooling of the gas this contains before passing into the benzol scrubbers about 50 to 60 grammes naphthalene per 100 cubic meters. In this case there is assumed a naphthalene content of the gas of 55 grammes per 100 cubic meters. The quantity of naphthalene contained in the gas therefore amounts per day to 165 kilogrammes, of which 150 kilogrammes are washed out per day by the washing oil.

The content of the gas in benzol and its homologues amounts to 25 grammes per cubic meter, that is per day 7500 kilogrammes benzol and homologues.

According to experience the quantity of washing oil, which passes over in the column apparatus 7 when driving off benzol and its homologues in order to obtain a sufficient removal of benzol and its homologues from the washing oil, is the same as the quantity of benzol driven off. In the example described 7500 kilogrammes of washing oil are thus distilled over daily in the column apparatus 7. In this quantity of washing oil there is also contained the total naphthalene contained in the oil, so that the 7500 kilogrammes of washing oil distilled over contain 8% naphthalene assuming that for washing benzol, homologues and naphthalene from the gas there was used a washing oil containing 6% naphthalene.

As the solubility of naphthalene in the washing oil at about 20 to 25° C. amounts to about 12%, naphthalene at these temperatures, which can be obtained without any artificial cooling of the washing oil, cannot be crystallized out of a washing oil with 8% naphthalene. The naphthalene therefore passes, according to the hitherto method of operation, together with the residual oil from the rectification apparatus for benzol back into the washing oil which then becomes enriched. This enriching continues until the vapor pressure of the washing oil with naphthalene is equal to the vapor pressure of the gas with naphthalene. As a result it follows that by the hitherto usual method of operation naphthalene cannot be washed from the gas together with benzol. On the contrary it was therefore always necessary to provide beyond the benzol scrubber a separate scrubber for naphthalene.

According to the invention the vapor mixture, escaping from the column apparatus 7, consisting of 7500 kilogrammes benzol and homologues, 6850 kilogrammes washing oil constituents and 650 kilogrammes naphthalene, is so decomposed that as first fraction there is obtained a washing oil, which does not contain more naphthalene than the initial washing oil, as second fraction a washing oil highly enriched with naphthalene and as third fraction benzol and its homologues.

For this purpose the condensate of the vapor mixture escaping from the column apparatus 7 is subjected in the pre-distillation stage 19 to a distillation at about 108° C. measured at the outlet of the distillation vapors at $a$, and the constituents entering the main distillation apparatus 30 to a distillation at about 88-90° C. measured at the outlet of the distillation vapors at $a'$. With this method of operation the residual oil, collecting in the pre-distillation stage 19 and withdrawn through the pipe line 29, contains 395 kilogrammes of naphthalene per day (=6%) and the residual oil in the main distillation stage 30, 255 kilogrammes of naphthalene per day (=27.1%). From the latter residual oil there are separated in the crystallization device 37 150 kilogrammes of naphthalene per day. From this it follows that the fresh washing oil flowing back into the storage tank 39, through the pipe lines 43, 44, 46 and 38 now only contains 22,500 kilogrammes of naphthalene per day equal on an average to 6% naphthalene. This naphthalene content of the washing oil again flowing back into the benzol scrubbers remains constant when carrying out the process according to the invention. It is possible with this constant naphthalene content of the washing oil to remove the naphthalene from the gas up to 5 grammes per 100 cubic meters of gas during the benzol scrubbing step. This content of naphthalene in the gas is so slight that a separate subsequent washing out of naphthalene as a rule is unnecessary. If, however, for special reasons a still further reduction of the naphthalene content of the gas should be necessary this is substantially simpler and cheaper as the quantity of naphthalene, remaining in the gas, after the application of the process according to the invention, is only very slight.

In the foregoing the invention has been described with reference to an example for carrying it into effect, without however, the invention being limited to the method of carrying it out as described. On the contrary the process according to the invention can be modified in various respects without departing from the scope of the following claim.

I claim:

The method of removing and recovering benzol, its homologues and naphthalene from gases containing them, comprising: washing the gas with wash oil adapted to absorb benzol, its homologues and naphthalene therefrom; heating spent wash oil from the gas washing stage to drive off absorbed benzol, its homologues, naphthalene and a quantity of wash oil about the same as the quantity of benzol, its homologues and naphthalene; condensing the vapors from said heating step and pre-distilling the condensate at about 108° C. to remove benzol, its homologues and naphthalene together with a small portion of the wash oil that comes over with the vapors from the aforesaid heating step; condensing the vapors from the latter pre-distilling step and finally redistilling the condensate at about 88-90° C. to drive off benzol and its homologues leaving as residuum the naphthalene and wash oil that comes over with the vapors from the pre-distilling step; separating naphthalene from the latter residuum by atmospheric cooling to room temperature above 10° C.; separating the solid naphthalene from the so cooled wash oil; and returning the wash oil combined with the wash oil residuum from the first two distilling steps to the gas washing stage for another cycle, said combined wash oil being of sufficiently low concentration of naphthalene to effect the absorption of naphthalene from the gas.

ADOLF SCHMALENBACH.